Inventor:
Frederic R. Barker
Walter R. Soper,
by their attorney.

UNITED STATES PATENT OFFICE.

FREDERIC R. BARKER, OF BOSTON, AND WALTER R. SOPER, OF LYNN, MASSACHUSETTS.

MEASURING-MACHINE.

1,351,732.  Specification of Letters Patent.  Patented Sept. 7, 1920.

Application filed March 7, 1918. Serial No. 221,055.

*To all whom it may concern:*

Be it known that we, FREDERIC R. BARKER, a subject of King George V of England, residing at Boston, in the county of of Suffolk and State of Massachusetts, and WALTER R. SOPER, a citizen of the United States, residing at Lynn, in the county of Essex and State of Massachusetts, have invented new and useful Improvements in Measuring-Machines, of which the following is a specification.

This invention relates to improvements in measuring machines and more particularly to machines adapted for measuring the areas of skins, hides and the like and its object is to provide automatically operated instrumentalities capable of accurately measuring and indicating either irregular or regular areas.

Another object of the invention is to provide mechanism for resetting the indicator and the operating instrumentalities therefor after each measurement has been completed and still another object is to provide means for preventing inaccuracies or repeating, due to any accidental halting or warping of the areas that are being fed by the machine.

The invention consists in the combination and arrangement of parts, whereby the above objects and certain other objects hereinafter appearing may be attained, as set forth in the following specification and particularly pointed out in the claims.

Referring to the drawings.

Like numerals refer to like parts throughout the several views of the drawings.

Figure 1:
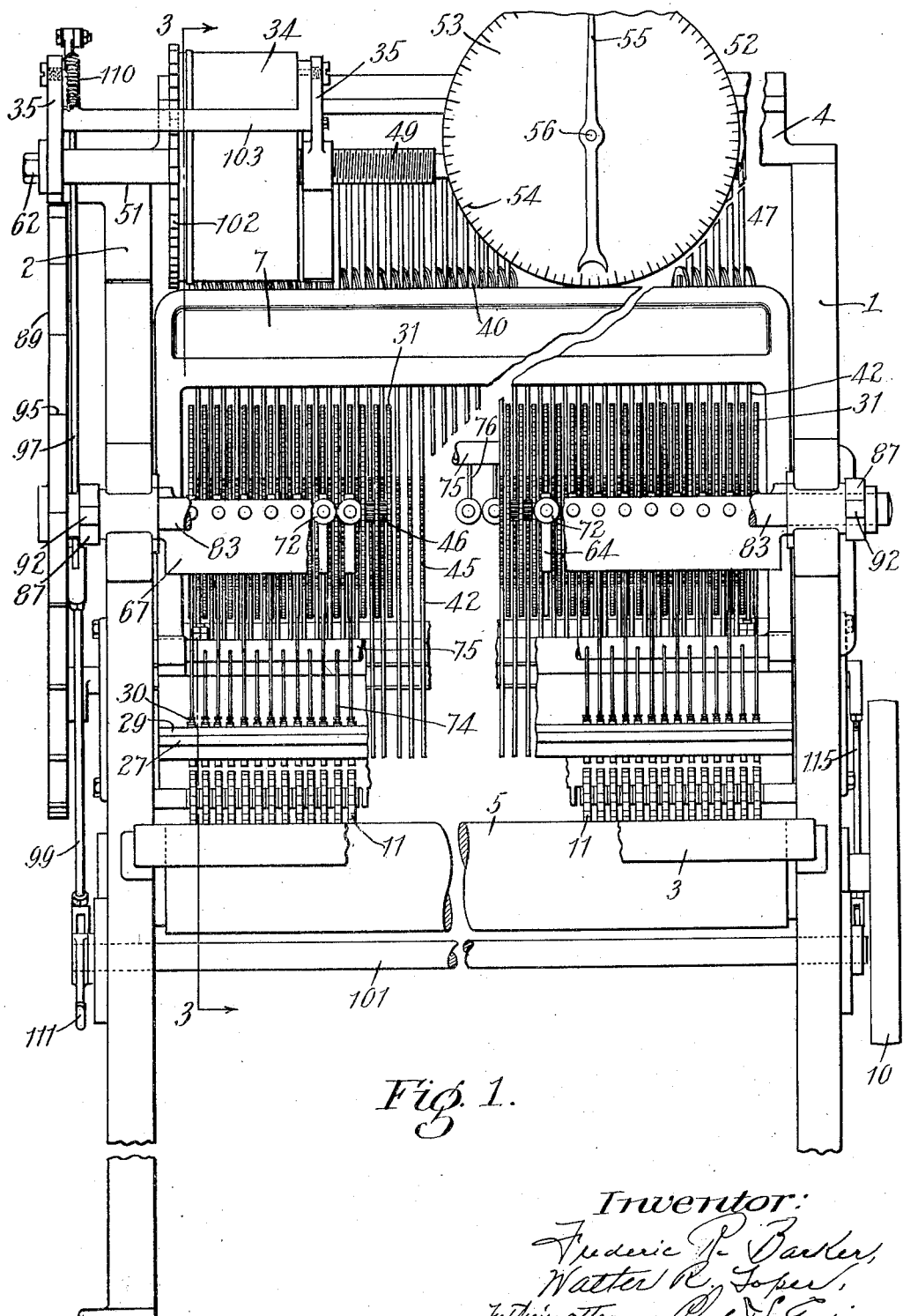
Figure 1 is a front elevation of a machine embodying our invention, portions being broken away to save space in the drawing.

In the drawings, 1 and 2 indicate side frames which are connected together by means of a work table 3 and a yoke 4. Arranged between the frames 1 and 2, and in coöperative relation to said work table is a work feeding roll 5, which projects through an opening or slot 6 in said table with the upper edge thereof substantially alining with the upper edge of said work table. The feed roll 5 is journaled to rotate in bearings upon the frames 1 and 2 and to one end of said roll is attached a pulley 10, through which power is transmitted from any suitable source to said roll.

Coöperating with the portion of the feed roll 5 which registers with the slot 6 in said work table are a plurality of work engaging members or feelers 11, preferably rotatably mounted upon independently movable levers 12 which are forked at 13 to receive their feelers and also to receive their supporting lugs 14, projecting downwardly from a transverse frame 7 arranged between the frames 1 and 2 above said work table and provided with lugs 8, 8 at opposite ends, adapted to fit into sockets or recesses 9 in the side frames 1 and 2. The lugs 14 are forked at 15 to receive, from below, a pin 16 constituting the pivot for said lever 12. Each rotary feeler 11 is mounted at one end of its lever 12 and the opposite end of said lever is connected with a spring 17 extending upwardly to a bar 18 disposed transversely of the machine.

The lugs 14 are supported on the frame 7 by a transversely disposed bar 19 which is adjustable vertically relatively to said frame by means of adjusting screws 20, said screws having screw threaded engagement with said bar 19 and shouldered into a portion of said frame 7 at 21, said screws being prevented from rotating by check nuts 22.

The rotary feelers 11 are adapted to be rotated when the work is inserted between said feelers and the roll 5 and they are also adapted to be moved upwardly or away from said roll by the thickness of the work, thus rocking the levers 12 about their pivots 16 and extending the springs 17. The feelers 11 are furthermore disposed at predetermined distances apart or as near together as practical and this distance governs the width of the smallest unit which may be measured by the machine.

Each of the feelers 11 is provided with a plurality of insulating sections 23 inserted at predetermined distances apart along the periphery thereof, the distance between said insulating sections being preferably equal to the distance between successive feelers so that a square will be formed, by adjacent feelers and adjacent insulating sections, to indicate the smallest unit of measurement of the machine.

Directly above each of said feelers is a brush 24, the end of which is so narrow that it will not be able to engage but one of the insulating sections of said feelers or but one of the sections of said feelers between said insulating sections at a time. The brush 24 has a head 25 to prevent it from dropping below a certain point, so as to maintain the lower end of said brush at a predetermined distance from the periphery of the feeler therebeneath when said feeler is in contact with the feed roll 5. The brushes 24 are arranged to reciprocate slightly, when engaged by said feelers, in insulating bushings 26 which are mounted in a lateral rib 27 on the transverse frame 7.

The brushes 24 are yieldingly held in their lowermost positions against the heads 25 thereof, preferably by means of flat springs 28, which are attached to an insulating bar 29 extending lengthwise of the rib 27, said springs forming electric conductors between said brushes and binding posts 30 which are utilized in securing said springs to the insulating bar 29. The rotary feelers 11 and brushes 24 constitute electric make and break devices for electric circuits which will be hereinafter more fully described.

Mounted in the frame 7 is a series of rotary disks 31 having a predetermined number of teeth 32 formed in their peripheries. These disks are arranged to rotate independently of each other. A constant pressure is applied to each of the disks 31 to rotate said disks in one direction, preferably by means of a spring 33 arranged within a drum 34 rotatably mounted between brackets 35, 35 projecting from the frame of the machine. The motion from the drum 34 and spring 33 is transmitted to the disks 31, preferably through a flexible element 36 secured at 37 to the periphery of the drum 34. Said flexible element extends over one of a series of rolls 38 rotatably mounted upon a common shaft suitably supported in the yoke 4.

From the roll 38, which said flexible element first engages, said flexible element extends downwardly around one of a second series of rolls 40, thence upwardly over the next roll of the series 38 and again downwardly to the next roll of the series 40 and so on throughout the entire series of rolls 38 and 40 to the end thereof, the end of said flexible element being permanently secured either to the frame or to one of said rolls, preferably one of the rolls of the series 38.

Each of the rolls 40 is pivotally mounted in the forked end 41 of a slide 42, vertically disposed to slide in guides 43 and 44 in the upper and lower portions of the transverse frame 7.

The slides 42 are also provided with a series of teeth 45 constituting a rack, which teeth are adapted to engage a pinion 46, one of which is secured to each of the disks 31 to rotate therewith, said slides being arranged to reciprocate in the spaces between successive disks of the series. It will thus be seen that the action of the spring 33 on the drum 34, acting through the instrumentalities of the flexible elements 36, racks 42 and pinions 46, will impart a rotary motion to said disks.

Each of the rolls 40 forms, as it were, a loop 47 in the flexible element 36 and these loops are preferably in their longest form when the parts of the measuring machine are in their initial or starting position, ready to measure a hide, in which position the rolls 40 will be in their lowermost positions while the tension of the spring 33 on said flexible element tends to draw said rolls 40, together with their slides 42, to their upper positions, thereby shortening the loops 47 or tending to straighten said flexible element, the slack produced in said flexible element by the shortening of said loops being wound about the periphery of the drum 34.

The drum 34 is made long enough to accommodate the entire slack produced in the flexible element 36 by the combined movements of all of the slides 42 in their upper positions and furthermore said drum is arranged to be moved longitudinally of its axis sufficient to permit the coils of said flexible element to be laid in a single course about the periphery thereof without overlapping.

The flexible element 36 is preferably made of suitable flat material, such as steel or the like, and the longitudinal movement of the drum 34 during each complete rotation thereof will be equal at least to the width of said flexible element. To acomplish the longitudinal movement of said drum the arbor 48 thereof is preferably secured to said drum to rotate therewith and a portion of said arbor is screw threaded at 49, the pitch thereof being equal to the required amount of travel for said drum in order to wind the flexible element thereon. These screw threads are engaged by a stationary screw threaded member, preferably one of the brackets 35, which thereby causes said drum and arbor to move bodily when rotated by the spring 33.

To accommodate for the longitudinal movement of the drum 34 the spring 33 arranged within said drum is attached at one end to a lug 50 formed on one of the brackets 35, while the opposite end of the spring is secured to the end of the drum 34 and these ends are so attached that they will not be disconnected when said drum moves away from the bracket bearing the lug 50 and during this movement the spring will be extended. The other end 51 of the arbor of said drum is arranged to reciprocate in the other bracket 35.

The longitudinal movement of the flexible element 36 in one direction, that is, the direction caused by the shortening of the loops 47, is the movement which indicates the area or measurement of the hide or skin passing through the machine and in order that this movement may be visible to the operator of the machine it is transferred, through the longitudinal movement of said drum, upon which said flexible element is wound, to a suitable indicator 52, preferably consisting of a stationary dial 53 having graduations 54 upon its face, preferably indicating fractions of a square foot, such, for instance, as 1/100.

A hand 55 is attached to a spindle 56 arranged at the center of said dial and this spindle has a pinion 57 attached thereto which engages a rack 58. The rack 58 is slidably mounted in a bracket 59 which constitutes a support for the dial 53 and this rack is rotatably connected with the arbor 48 so as to permit said arbor to rotate while the rack itself is prevented from rotating for the reason that it is made square and engages a square recess in the bracket 59.

A shoulder 60 on said rack engages one end of the arbor 48 and the other end of said arbor is engaged by a collar 61 fastened to said rack by means of a nut 62, so that all of the longitudinal movement of the drum and its arbor will be imparted to the rack 58, whereas the rotary movement of said arbor will have no effect on said rack.

The action of the spring 33 upon the flexible element 36 longitudinally thereof and in one direction is constant, whereas the actual movement of said flexible element is only step by step, which step by step movement is controlled by escapements 63 operating in conjunction with the teeth 32 of the disks 31. The disks 31 do not occupy very much space so that they may be placed very close together, much closer, in fact, than it is possible to place the escapement mechanism consequently, the escapements have been arranged in two groups A and B upon opposite sides respectively of the series of disks 31, the escapements of the group A engaging every other disk of the group while the escapements of the group B engage alternate disks and being on the opposite side thereof are reversed so as to properly engage the teeth 32 of said disk.

The preferred form of escapement used with each of said disks consists of a pivoted member 64 pivoted at 65 upon a forked arm 66 directed toward the disks 31 from a bar 67, arranged transversely of the machine between the frames 1 and 2. The pivoted members 64 are U-shaped and support, between the arms thereof and upon opposite sides of the pin 65, pins 68 and 69 and these pins are arranged to engage the teeth 32 of said disks, one at a time and constitute stop pawls.

Figure 3:
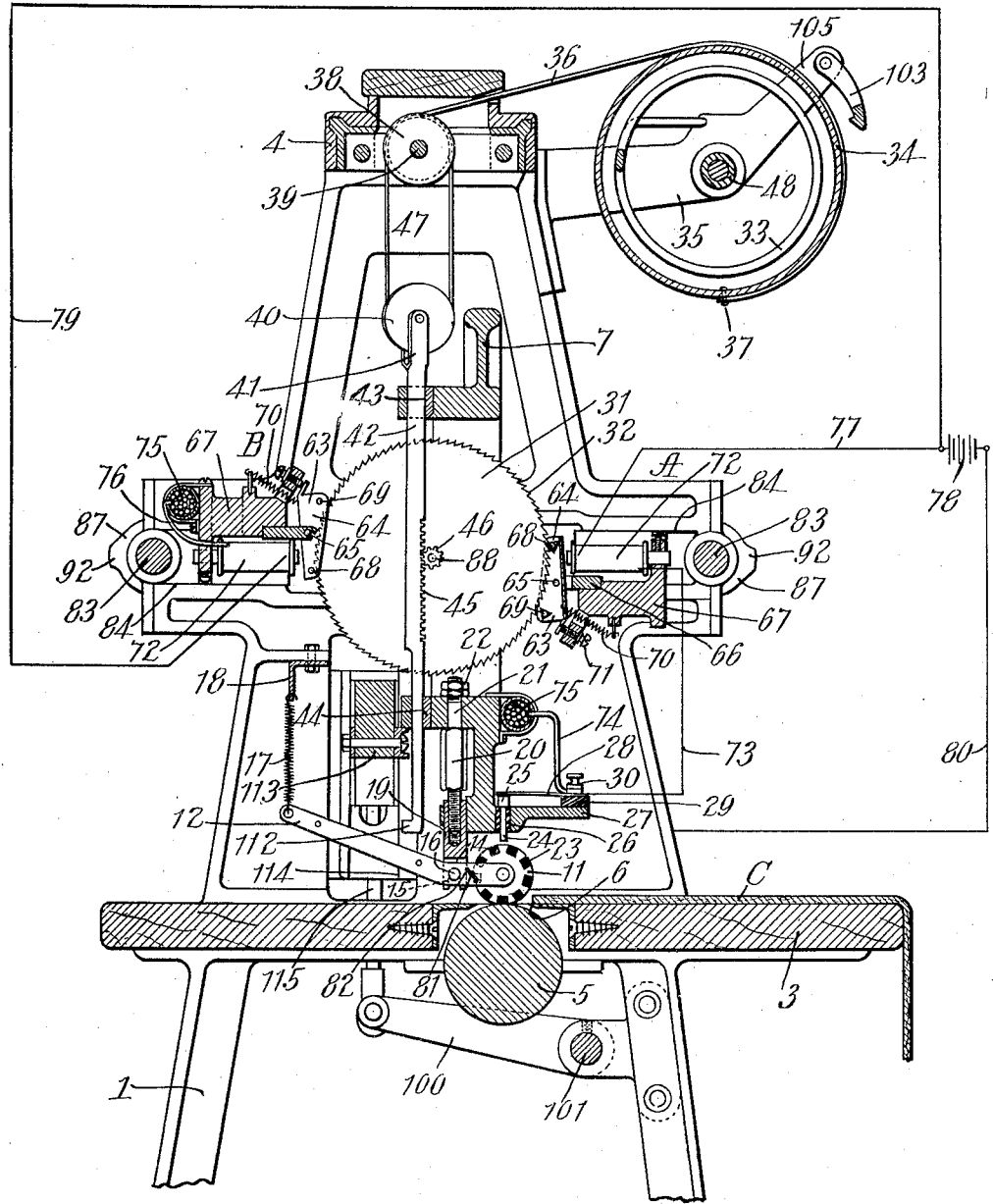
Fig. 3 is a vertical section taken on the line 3—3 of Fig. 1.
Figure 4:
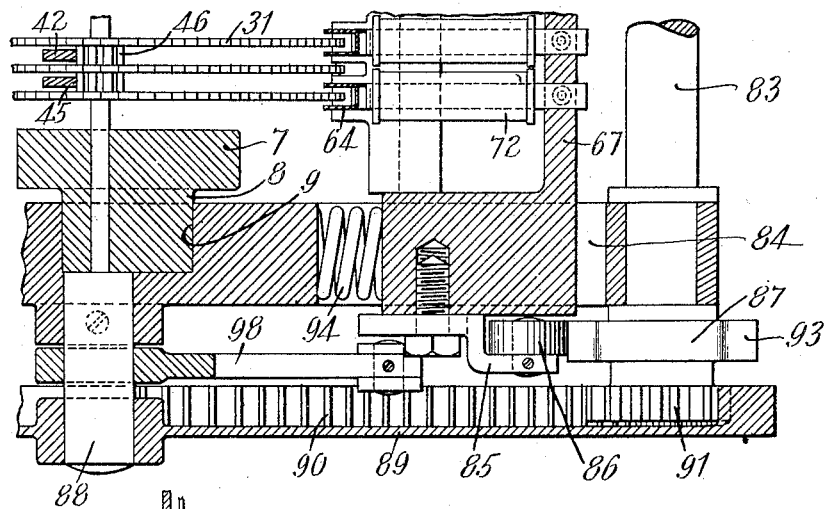
Fig. 4 is a detail sectional view taken on the line 4—4 of Fig. 2, illustrating portions of the resetting mechanism.
Figure 7:
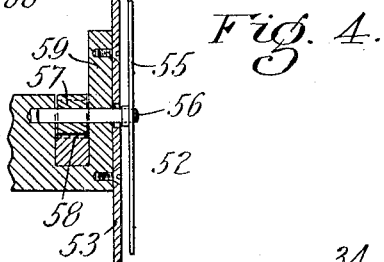
Fig. 7 is a detail section taken on the line 7—7 of Fig. 5.
Figure 5:
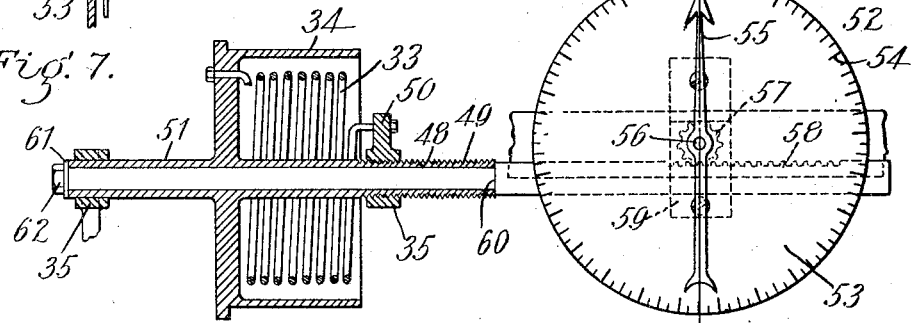
Fig. 5 is a detail view, partly in section and partly in elevation, of the area indicator and indicator operating means.
Figure 6:
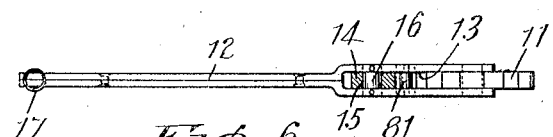
Fig. 6 is a detail plan view of one of the rotary feelers and the feeler supporting lever.

By referring to Fig. 3, it will be seen that the uppermost pin 68 of the group A is at present in engagement with the periphery of the disk 31, in which position it is held by a spring 70 extending from said pivoted member 64 to a pin attached to the bar 67. An adjusting stop screw 71 is mounted upon said bar, adapted to engage and limit the pivotal movement of said member 64 by the spring 70. The movements of the indicator hand 55 are controlled by the escapements 63, while the escapements are, in turn, rendered operative by the feeding of the work preferably through the instrumentalities or electrical means including the rotary feelers or work engaging members 11 and electro-magnets 72 mounted adjacent to each of the pivoted members 64 and adapted to be energized by the engagement of one of the brushes 24 with its respective rotary feeler 11.

The energizing of each magnet 72 attracts the portion of the pivoted member 64 carrying the pin 68 which lies adjacenet to the armature of said magnet and this movement of said member causes the pin 68 to be withdrawn from the tooth of the disk 31 while the pin 69 will be moved into engagement with the periphery of said disk. The distance between the pins 68 and 69 is such that on the withdrawal of the pin 68, said disk will move a portion of a tooth before engaging the pin 69 and upon the deënergizing of the coils of the magnet 72 the spring 70 returns the pivoted member to its normal position, withdrawing the pin 69 from the tooth engaged thereby and causing the pin 68 to move into contact with the periphery of said disk in time to engage the very next tooth to that previously engaged by said pin; in other words, each disk will be moved the space of one tooth each time the escapement makes one complete operation.

The escapements carried by the bar of the group B are substantially identical in construction to those of the group A with the exception that the pivoted members 64 are inverted in this group so as to bring the pins 68, which normally engage the peripheries of the disks 31, at the bottom while the pins 69 are at the top and this necessitates the inverting of the entire bar 67 so as to bring the electro-magnets 72 into the proper positions with respect to their pivoted members 64.

Each rotary feeler 11, together with its brush 24, constitutes, as hereinbefore stated, an electric make and break device, and this make and break device, coöperating with the electrically operated escapement 63, controls the movement in one direction of one of the disks 31 and this, in turn, when operated, transmits motion to the slide 42 operatively connected therewith, so as to permit a straightening movement of the flexible element 36 to take place, whereby the area indicating device will be operated.

The electrical connection between said make and break device and said escapements may be made in numerous ways. In the present case, however, a conductor 73 extends from every other binding post 30 upwardly to successive electro-magnets 72 of the group A, while the alternate binding posts 30 may be connected, by means of conductors 74, with a cable 75 and this cable extends transversely of the machine around the end of the frame 7 and thence upwardly to the bar 67 of the group B, while from said cable conductors 76 extend to the magnets 72 carried thereby.

From the magnet 72 of group A a conductor 77 extends to the source of current, preferably a battery 78, the other pole of said battery being electrically connected with the frame of the machine through which the current may pass to the rotary feelers 11.

The electro-magnets 72 of the group B are also connected, by conductors 79, with the battery 78, while the electric circuit for this group is completed as in the case of group A, through the frame of the machine. As the work, represented at C, is fed into the machine between the feed roll 5 and the series of rotary feelers 11, the feelers 11 will be moved away from said roll 5, causing said feelers to engage their respective brushes which they will continue to engage so long as the work remains between said feelers and said roll.

The rotation of the feed roll 5 causes the work to be fed along over the work table 3 and during such movement said feelers will be rotated and the brushes engaging said feelers will alternately engage the insulating sections 23 and the uninsulating sections of said feelers which are separated by said insulating sections. In this manner, the electric circuit, including said feelers, will be opened and closed in rapid succession and due to this action the escapements will also be operated in rapid succession to permit the step by step rotation of the disks 31.

During the operation of the machine, if, for any reason, the work should catch or its progress be interfered with or should there be any tendency to withdraw said work from between the feelers and the feed roll after it has once started, such a movement will be prevented by means preferably including a roller 81, disposed transversely of the forked end of each of the levers 12. The ends of said rollers are reduced in size and engage inclined slots 82 arranged substantially tangential with relation to the peripheries of said feelers and said rollers engage the peripheries of the feelers and when an attempt is made to turn said feelers in the reverse direction, said rollers will be wedged firmly against the peripheries thereof and lock the same against movement in that direction, no resistance being offered by said rollers to the feelers when operating in the forward direction.

When the escapements hereinbefore described are in engagement with said disks, the drum can operate in but one direction and this movement results in the partial unwinding of the actuating spring. It is, therefore, necessary that said spring be rewound occasionally, and the several slides 42 returned to their initial or starting positions so as to elongate the loops 47. This result may be accomplished after each skin or hide has been measured or after a number of hides have been measured, according to the will of the operator.

To accomplish the rewinding of the spring 33 and the resetting of the several slides, it will be necessary to withdraw or retract the escapements from their respective disks and when these are retracted the drum 34 must be prevented from being rotated farther by the action of the spring 33 therein. The instrumentalities for accomplishing the resetting of the machine preferably include shafts 83, one of which is rotatably mounted in the frame of the machine parallel with each of the bars 67, and said bars are slidably mounted to move toward and away from said shafts in guides 84 formed in the side frames 1 and 2, said bars constituting carrier bars for the escapements.

Secured to the opposite ends of each of the bars 67, by brackets 85, are rolls 86 and these rolls are adapted to engage cams 87 attached to opposite ends of each shaft 83. At one side of the machine and pivoted to rotate upon a shaft 88 is a gear 89, preferably of the internal type, having teeth 90 adapted to mesh with the teeth of pinions 91, 91, one of such pinions being attached to each of the shafts 83. The cams 87 are preferably open cams and have two elevations 92 and 93 disposed substantially 180° apart.

The normal positions of the cams 87 are with one or the other of the elevations 92 or 93 in engagement with the rolls 96, whereby the carrier bars 67 will be held in their inner positions with the escapements thereof in their operating positions, as shown in the drawing. The rolls 86 are yieldingly held in contact with said cams, preferably by means of springs 94, one of which is arranged at each end of the bar 67 and upon the rotation of the cams 87 said springs will retract said bar.

Figure 2:
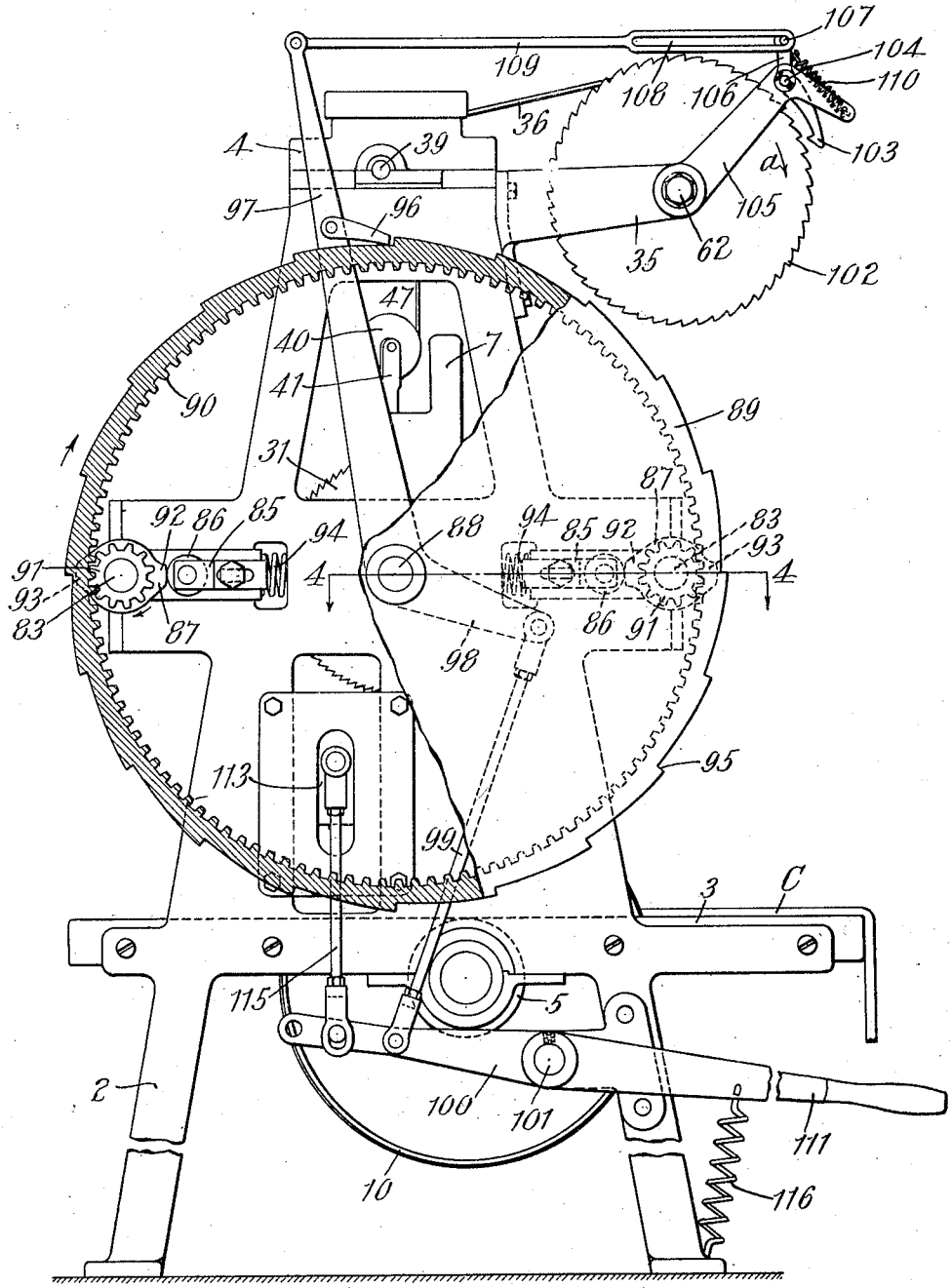
Fig. 2 is a left hand side elevation of the machine with parts shown in section and other parts removed to save space.

The gear 89 has a series of ratchet teeth 95 on its outer periphery which are adapted to be engaged by a pawl 96 mounted upon a lever 97. The lever 97 is pivotally mounted on the shaft 88 and this lever has an arm 98 connected, by means of a link 99, with one of a pair of levers 100, disposed at opposite ends of a shaft 101 arranged to rock in bearings on the frames of the machine. This shaft may be rocked by any suitable means, one method being a hand lever 111, as shown in Fig. 2 of the drawings.

The means for preventing the unwinding of the spring 33 when said escapements are retracted from their disks preferably includes a ratchet 102 attached to the drum 34 and a pawl 103 pivotally mounted at 104 between extensions 105 on the arms 35. The pawl 103 is an elongated one, adapted to engage the teeth of the ratchet 102, regardless of the position of the drum 34. This pawl has an arm 106 provided with a pin 107 which projects into a slot 108 formed in a link 109. This link is pivotally connected to the upper end of the lever 97.

A spring 110 is interposed between the arm 106 and the extension 105 and normally tends to move the tooth of the pawl 103 to engage the teeth of the ratchet. The instrumentalities employed in returning the slides 42 to their initial positions include hooks 112 formed upon said slides and these hooks are adapted to be engaged by a bar 113 arranged to slide vertically in guides 114 formed in the side frames of the machine. The opposite ends of the bar 113 are connected, by links 115, with the levers 100. The bar 113 is normally maintained in a position above the hooks 112 and in a position which will not interfere with the movements of said hooks during the measuring operation, by means of a spring 116, but when said bar is lowered by the operation of the hand lever 111, the hooks which have been moved upwardly during the measuring operation will be engaged thereby and moved to their lower or initial positions.

The general operation of the machine hereinbefore described in detail is as follows:

The work is placed upon the table 3, as shown at C, Fig. 3, and advanced until the end is engaged by the feed roll and the upper surface thereof engaged by the feelers 11. The thickness of the work must be sufficient to move the feelers, or at least those engaged thereby, upwardly laterally of the feed roll 5 until said feelers engage their brushes 24.

As the work is fed between the feelers and the feed roll the brushes 24 will alternately engage the insulating sections 23 and the uninsulated portions of the feelers and an electric current will thereby be permitted to intermittently circulate through the brushes 24, springs 28 and conductors to the several electro-magnets, energizing said magnets and causing the escapements coöperating therewith to be rocked about their pivots in one direction by said magnet and in the opposite direction by the springs 70 upon the deënergizing of said magnets.

The rocking of said escapements permits the spring 33, acting through the flexible element 36, slides 42 and pinions 46, to rotate the disks 31, which are released by the rocking of said escapements a tooth at a time, producing a gradual shortening of the loops 47 and the straightening of said flexible element. The portions of said elements released by such movements of the escapements will be wound upon the drum 34 and as said drum rotates a movement will be imparted longitudinally thereof by the screw 49, thereby transmitting the movements of the slides 42 to the indicator hand 55, which registers, on the dial, the combined movements of said slides and their coöperating parts.

Each electrical contact made by the brush 24 upon the uninsulated portion of the feeler operating therewith will represent the smallest unit of measurement capable of being performed by this machine and this measurement, in the present instance, is $\frac{1}{2}$ a square inch for the reason that the insulating sections are $\frac{1}{2}''$ apart and the feelers are $\frac{1}{2}''$ apart and the combined areas traversed by the several feelers, which are in contact with the work and moved by the thickness thereof, will be indicated on the dial of the machine, representing the total measurement or area of the work which has passed therethrough.

To reset the machine for the next measuring operation the shaft 101 must be rocked either by manual means, such as the lever 111, or any other suitable mechanism, and in doing this motion is transmitted to the lever 97, which, through the pawl 96, rotates the gear 89 a sufficient distance to impart a 180° movement to the shafts 83.

During the initial movement of said lever 97 and while the pawl 96 is moving to engage the first tooth in the periphery of said gear the link 109 will be moved toward the right, Fig. 2, to release the pawl 103 which will immediately engage the teeth of the ratchet 102 and prevent further movement thereof in the direction of the arrow a. After this has taken place and during the first part of the movement of the gear 89 the elevations 92 of the cams 87 which engage the rolls 86 and hold the slides bearing said rolls in their inner positions, will be moved from behind said rolls and the springs 94 cause the carrier bars to move outwardly, retracting or withdrawing the escapements from their respective disks.

After this movement has been accomplished by the cams 87, the rotation of said cams will be continued until the elevations 93 are brought into contact with said rolls 86 and said carrier bars are moved inwardly to their operating positions, but during the time when said slides are in their outermost positions the levers 100 will operate, through the links 115 and bar 113, to move the slides 42 to their lowermost or initial positions and such movements of the slides 42 cause their disks to be rotated and their loops 47 to be elongated and the drum rotated in a direction opposite to that indicated by the arrow $a$ to rewind the spring 33.

After all of these functions have been performed, the lever 111 will be returned to its starting position and during this movement the bar 113 will be elevated and the lever 97 returned to its starting position. At the end of the movement of said lever 96 the pin 107 will engage the ends of the link 109 and withdraw the pawl 103 from the teeth of the ratchet 102.

This movement takes place after the carrier bars have been moved to their inner positions and the disks 31 locked by their escapements, permitting the pins of said escapement to prevent a further unwinding movement of the spring 33 to replace said pawl 103.

While we have shown and described specific forms of the mechanisms for accomplishing the objects of our invention, it will be obvious that many variations therein may be made without departing from the spirit and scope of the invention.

Having thus specifically described our invention what we claim and desire by Letters Patent to secure is:

1. An area measuring machine having, in combination, work feeding means, a rotary feeder adapted to be moved laterally of said work feeding means by the thickness of the work, area indicating means, an escapement mechanism, means connecting said feeler mechanism and said escapement mechanism to transmit motion from the former to the latter and means to connect said escapement mechanism with said area indicating means.

2. A measuring machine having, in combination, work feeding means, a feeler adapted to be moved away from said work feeding means by the thickness of the work, an indicator, means for operating said indicator, an escapement, means connecting said feeler and said escapement to transmit motion from the former to the latter and means to connect said escapement with said indicator operating means.

3. A measuring machine having, in combination, work feeding means, a feeler yieldingly mounted adjacent to said work feeding means adapted to be moved by the thickness of the work, an indicator, means adapted to operate said indicator, an escapement adapted to control the movements of said indicator, an electrical operating means for said escapement and a switch adapted to be closed by the movements of said feeler to effect the operation of said electrical operating means.

4. A measuring machine having, in combination, a feed member, a rotary member arranged to coöperate with said feed member during the feeding of the work, and having a series of insulating sections in the periphery thereof, a brush adapted to engage the periphery of said rotary member, an indicator, and electrical instrumentalities operated by the engagement of said brush and said rotary member to effect the operations of said indicator.

5. A measuring machine having, in combination, a feed member, an indicator, means for operating said indicator, an escapement adapted to effect the movements of said indicator operating means, electrical means adapted to operate said escapement, and including an electric make and break device, said make and break device including a rotary member adapted to be rotated by the work during the feeding thereof.

6. An area measuring machine having, in combination, a rotary member including a series of spaced contacts adapted to coöperate with said feed member, during the feeding of the work, an electric circuit including a brush adapted to coöperate with said contacts during the rotation of said rotary member to open and close said circuit, area indicating means, an escapement adapted to effect the movements of said area indicating means, and means included in said electric circuit adapted to operate said escapement.

7. An area measuring machine having, in combination, a feed member, a rotary member including a series of spaced contacts in its periphery and adapted to coöperate with said feed member during the feeding of the work, means for preventing a reverse movement of said rotary member, a brush adapted to engage said contacts upon the insertion of the work between said rotary member and said feed member, area indicating means, and electrically operated instrumentalities adapted to be operated by the movements of said rotary member while in contact with said brush, adapted to effect the movements of said area indicating means.

8. An area measuring machine having, in combination, work feeding means, a brush, a feeler including a series of spaced contacts and adapted to be moved by the thickness of the work into contact with said brush, an indicator, means for operating said indicator, and an electrically operated escapement in circuit with said brush adapted to coöperate with said feeler to effect the operations of said feeler operating means.

9. An area measuring machine having, in combination, a feed roll, an electric circuit, a rotary make and break device for said electric circuit, adapted to be engaged by said feed roll during the feeding of the work, area indicating means, means for operating said area indicating means, and electrical instrumentalities included in said electric circuit adapted to effect the operation of said area indicating means.

10. An area measuring machine having, in combination, work feeding means, an indicator, electrically operable means for effecting the operations of said indicator, a rotary member having yielding rotatable engagement with said work feeding means, adapted to be moved away from said work feeding means by the work, an insulating section in said rotary member, and a brush adapted to alternately engage said insulating section and said rotary member during the feeding of the work and constituting an electric make and break device for said electrically operable means.

11. An area measuring machine having, in combination, a feed member, a rotary member adapted to coöperate with said feed member to feed the work, a series of insulating sections arranged at predetermined distances apart about the periphery of said rotary member, a brush adapted to engage the periphery of said rotary member, an electric circuit including said rotary member and said brush adapted to be alternately opened and closed by the rotation of said rotary member in contact with said brush, an escapement, and electrical instrumentalities included in said electric circuit adapted to operate said escapement.

12. An area measuring machine having, in combination, a feed member, a rotary member yieldingly disposed in operative relation to said feed member adapted to coöperate with said feed member to feed the work, a series of insulating sections disposed about the periphery of said rotary member, a brush normally disposed out of contact with said rotary member adapted to be engaged thereby during the feeding of the work, an electric circuit including said brush and said rotary member adapted to be successively opened and closed during the rotation of said rotary member in contact with said brush, area indicating means, and electrical instrumentalities included in said electric circuit adapted to effect the operation of said area indicating means.

13. A measuring machine having, in combination, a rotary drum, means for rotating said drum, an escapement adapted to be operated to impart a step by step movement to said drum, a feed roll, electrically operated means adapted to operate said escapement, and a make and break device adapted to effect the operation of said electrical instrumentalities, said make and break device being also adapted to coöperate with said feed roll to feed the work.

14. A measuring device having, in combination, a rotary drum, a spring adapted to impart a rotary movement to said drum in one direction, a plurality of rotary disks, a pinion secured to each of said disks, a rack engaging each of said pinions, a roll attached to each of said racks, a series of rolls mounted to rotate about a common axis in coöperation with the rolls on said racks, a flexible element fixed at one end and attached at the other end to the periphery of said drum and adapted to be wound thereon, said element also being constructed and arranged to engage successive rolls of the series of rolls arranged about said common axis alternately with successive rolls of said racks, a feed roll, a series of rotatable members adapted to coöperate with said feed roll to feed the work, electric circuits including said rotary members adapted to be opened and closed by the rotation of said rotary members during the engagement of said rotary members with the work, and electrical instrumentalities included in said electric circuit adapted to effect a step by step rotation of said disks to wind said flexible element upon said drum.

15. In a measuring machine a flexible element, a loop forming member for said flexible element, means for controlling the movements of said loop forming member, said means including an escapement, means adapted to exert a yielding straightening action upon said flexible element, and means coöperating with said escapement adapted to be operated by the work to release said flexible element step by step.

16. In a measuring machine a flexible element, a loop forming member for said flexible element, means for controlling the movements of said loop forming member, said means including an escapement, means adapted to exert a yielding straightening action upon said flexible element, means coöperating with said escapement adapted to be operated by the work to release said flexible element step by step, and an indicator adapted to indicate the movements of said flexible element.

17. In a measuring machine a flexible element, means for forming a series of loops in said flexible element, means adapted to exert a straightening action upon said flexible element, means for effecting a step by step release of said loop forming means, an indicator, and means adapted to operate said indicator proportionately to the releasing of said flexible element.

18. In a measuring machine a flexible element, means for forming a series of loops in said flexible element, means adapted to exert a straightening action on said flexible element, work feeding means, a feeler for each of said loop forming means, adapted to be moved by the work, and means including said feelers adapted to effect the release of said loop forming means step by step.

19. In a measuring machine the combination of a movable member, a flexible element connected at one end to said movable member, the other end being fixed, a plurality of loop forming members for said flexible element, means for exerting a yielding pressure longitudinally of said flexible element, work feeding means, a plurality of feelers adapted to coöperate with said work-feeding means, and movable independently of each other, means adapted to coöperate with said feelers to accomplish a step by step movement of said loop forming members to change the condition of said flexible element, and means for indicating the change in the condition of said flexible element.

20. In a measuring machine the combination of a movable member, a flexible element connected at one end to said movable member, the other end being fixed, a plurality of independently movable loop forming members for said flexible element, means for exerting a yielding pressure longitudinally of said flexible element, work feeding means, a plurality of feelers adapted to coöperate with said work feeding means and movable independently of each other, means adapted to coöperate with said feelers to accomplish a step by step movement of said loop forming members to change the condition of said flexible element, and means for indicating the change in the condition of said flexible element.

21. A measuring machine having, in combination, a rotary drum, a flexible element connected at one end to said drum, the other end being fixed, a plurality of loop forming members for said flexible element, means for holding said loop forming members in their loop forming positions, a spring adapted to rotate said drum to wind said flexible element thereon, work feeding means, a plurality of feelers adapted to coöperate with said work feeding means, said feelers adapted to be moved independently of each other by the work, means coöperating with said feelers adapted to accomplish a step by step movement of said loop forming members to release said flexible element and permit the same to be wound upon said drum, and means for indicating the movement of said drum.

22. A measuring machine having, in combination, a rotary drum, a flexible element connected at one end to said drum, the other end being fixed, a plurality of loop forming members for said flexible element, means for holding said loop forming members in their loop forming positions, a spring adapted to rotate said drum to wind said flexible element thereon, work feeding means, a plurality of feelers adapted to coöperate with said work feeding means, said feelers adapted to be moved independently of each other by the work, means coöperating with said feelers adapted to accomplish a step by step movement of said loop forming members to release said flexible element and permit the same to be wound upon said drum, and means for returning said loop forming members to their initial positions.

23. A measuring machine having, in combination, a rotary drum, a flexible element connected at one end to said drum, the other end being fixed, a plurality of loop forming members for said flexible element, means for holding said loop forming members in their loop forming positions, a spring adapted to rotate said drum to wind said flexible element thereon, work feeding means, means coöperating with said work feeding means, adapted to accomplish a step by step movement of said loop forming members to release said flexible element and permit the same to be wound upon said drum, and means for rewinding said spring.

24. In a measuring machine the combination of a flexible element, a loop forming member for said flexible element, means for holding said loop forming member in its loop forming position, said means including an escapement, a spring adapted to exert a straightening action upon said flexible element, work feeding means, means coöperating with said escapement adapted to be operated by the work to release said loop forming member step by step, and means adapted to disconnect said escapement from said loop forming member and to return said loop forming member to its initial position.

25. In a measuring machine the combination of a flexible element, a loop forming member for said flexible element, means for holding said loop forming member in its loop forming position, said means including an escapement, a spring adapted to exert a straightening action upon said flexible element, work feeding means, means coöperating with said escapement adapted to be operated by the work to release said loop forming member step by step, and manually operable means adapted to disconnect said escapement from said loop forming member and to return said loop forming member to its initial position.

26. In a measuring machine the combination of a flexible element, a plurality of loop forming means for said flexible element including parallelly disposed slides, each having engagement with said flexible element, means for holding said slides in their loop forming positions, said means including escapements, a spring adapted to exert a straightening action on said flexible element, means for feeding the work, a plurality of independent work engaging members, and means operatively connecting each of said work engaging members with one of said escapements adapted to operate said escapement to release said slides step by step.

27. In a measuring machine the combination of a flexible element, a plurality of loop forming means for said flexible element including parallelly disposed slides, each having engagement with said flexible element, means for holding said slides in their loop forming positions, said means including escapements, a spring adapted to exert a straightening action on said flexible element, means for feeding the work, a plurality of independent work engaging members, means operatively connecting each of said work engaging members with one of said escapements adapted to operate said escapement to release said slides step by step, and a common actuator for said slides adapted to return said slides to their initial loop forming positions.

28. A measuring machine having, in combination, a rotary drum, a spring adapted to rotate said drum in one direction, a flexible element secured at one end to said drum, adapted to be wound about the periphery thereof, the other end of said flexible element being fixed, a series of rolls adapted to be engaged by said flexible element, means adapted to form loops in said flexible element between successive rolls of said series, means for holding said loop forming means in their loop forming positions, work feeding means, a plurality of independently movable work engaging members adapted to be moved by the feeding of the work, means operatively connecting said work engaging members with said holding means, adapted to release said holding means step by step and permit said flexible element to be wound about said drum, and means for indicating the movement of said drum.

29. A measuring machine having, in combination, a rotary drum, a spring adapted to rotate said drum in one direction, a flexible element secured at one end to said drum, adapted to be wound about the periphery thereof, the other end of said flexible element being fixed, a series of rolls adapted to be engaged by said flexible element, means adapted to form loops in said flexible element between successive rolls of said series, means for holding said loop forming means in their loop forming positions, work feeding means, a plurality of independently movable work engaging members adapted to be moved by the feeding of the work, means operatively connecting said work engaging members with said holding means, adapted to release said holding means step by step and permit said flexible element to be wound about said drum, means for withdrawing said holding means from said loop forming means, means adapted to prevent the rotation of said drum by said spring while said holding means are withdrawn, and means adapted to simultaneously return all of said loop forming means to their initial positions and to rewind said spring.

30. A measuring machine having, in combination, an area indicator, means for operating said indicator including a flexible element, a spring adapted to exert pressure upon said flexible element longitudinally thereof in one direction, means adapted to form a plurality of loops in said flexible element, said means including a plurality of slides, hooks on said slides, a bar disposed transversely of said slides adapted to be moved to engage said hooks and simultaneously move said slides to their extreme loop forming positions against the action of said spring, teeth connected with each of said slides, pinions adapted to engage the teeth of said slides, a ratchet disk secured to each of said pinions, an escapement for each of said ratchet disks adapted to prevent the rotation of said disks, work feeding means, a plurality of independently movable work engaging members adapted to be moved by the work, and means operatively connecting each of said work engaging members with one of said escapements, adapted to operate said escapements to release said ratchets tooth by tooth.

31. An area measuring machine having, in combination, a plurality of parallelly disposed slides, a spring actuated indicator operatively connected with said slides and adapted to indicate the combined movements thereof, a ratchet adapted to be rotated by the movement of each of said slides, means adapted to control the rotation of each of said ratchets in one direction, said means including an escapement, work feeding means, a plurality of work engaging members, and means operatively connecting each of said work engaging members with one of said escapements, adapted to be moved by the work to permit a tooth by tooth rotation of said ratchets.

32. An area measuring machine having, in combination, a plurality of parallelly disposed slides, a spring actuated indicator operatively connected with said slides and adapted to indicate the combined movements thereof, a ratchet adapted to be rotated by the movement of each of said slides, means adapted to control the rotation of each of said ratchets in one direction, said means including an escapement, work feeding means, a plurality of work engaging members, means operatively connecting each of said work engaging members with one of said escapements, adapted to be moved by the work to permit a tooth by tooth rotation of said ratchets, a carrier bar adapted to support a plurality of said escapements, means for retracting said bar to disconnect said escapements from their respective ratchets, and means for returning said slides to their initial positions while said bar is retracted.

33. In an area measuring machine a plurality of parallelly disposed spring actuated slides, means for effecting an independent step by step movement of said slides, said means including an escapement mechanism, work feeding means, means having rolling contact with the work, adapted to control the movements of said escapements, a carrier bar for a plurality of said escapements, means for retracting said carrier bar to release said slides, means for preventing the movements of said slides by said spring while said escapements are retracted, and means for simultaneously moving all of said slides to their initial positions.

34. An area measuring machine having, in combination, a spring actuated slide, an indicator adapted to indicate the movement of said slide, a ratchet operatively connected with said slide, an escapement pivotally mounted adjacent to the periphery of said ratchet, a pair of pawls carried by said escapement, a spring adapted to yieldingly maintain one of said pawls normally in engagement with said ratchet, an electro-magnet adapted to be energized to rock said escapement to withdraw said first named pawl from said ratchet and move the other of said pawls into engagement therewith, work feeding means, and electrical means coöperating with said work feeding means to alternately energize and deënergize said magnet, whereby said escapement may be operated to permit a tooth by tooth movement of said ratchet.

35. A measuring machine having, in combination, a plurality of relatively movable members, means for indicating the combined movements of said members, common actuating means for said members, adapted to exert a constant yielding action thereon, an escapement adapted to effect the movements of each of said movable members, work feeding means, and means coöperating with the work adapted to operate said escapements.

36. A measuring machine having, in combination, a plurality of relatively movable members, means for indicating the combined movements of said members, a spring adapted to exert a constant tension on all of said movable members, an escapement adapted to effect the movements of each of said members, work feeding means, and means coöperating with the work adapted to operate said escapements and release said movable members step by step.

37. A leather measuring machine comprising an indicator, means exerting constant actuating pressure on said indicator, a plurality of escapements, means common to and adapted to operatively connect said escapements with said indicator actuating means, and a plurality of spaced work actuated members operatively connected with said escapements adapted to effect the operations of said escapements, whereby the cumulative movements of said work actuated members may be indicated by said indicator.

38. An area measuring machine comprising an indicator, a plurality of spaced movable work actuated members, means for exerting constant actuating pressure upon said indicator, and automatic mechanism operatively connected with said work actuated members adapted to cause said indicator to be moved by said pressure exerting means to indicate the cumulative action of said work actuated members.

39. In a registering machine having a registering mechanism for indicating surface area, means for exerting constant actuating pressure on said registering mechanism, a plurality of work engaging members, and a plurality of escapement mechanisms operatively connected with said members adapted to effect the actuation of said registering mechanism by said pressure exerting mechanism.

40. An area measuring machine having, in combination, work feeding means, a series of rotatable work engaging members adapted to coöperate with said work feeding means, instrumentalities operatively connected with said rotatable members to indicate the area of the work, and means for preventing the rotation of said rotatable members in a reverse direction.

41. An area measuring machine having, in combination, means for feeding the work, a plurality of rotatable members adapted to yieldingly engage the work being fed by said work feeding means, means for preventing the rotation of said rotatable members in a reverse direction, and instrumentalities operatively connected with said rotatable members adapted to be operated by the rotatable and yelding movements of said rotatable members to indicate the area of the work.

In testimony whereof we have hereunto set our hands in presence of two subscribing witnesses.

FREDERIC R. BARKER.
WALTER R. SOPER.

Witnesses:
CHARLES S. GOODING,
SYDNEY E. TAFT.